United States Patent
Kwon et al.

(10) Patent No.: US 11,225,700 B2
(45) Date of Patent: Jan. 18, 2022

(54) ANNEALING SEPARATING AGENT COMPOSITION FOR GRAIN-ORIENTED ELECTRICAL STEEL SHEET, GRAIN-ORIENTED ELECTRICAL STEEL SHEET, AND METHOD FOR MANUFACTURING GRAIN ORIENTED ELECTRICAL STEEL SHEET

(71) Applicant: POSCO, Pohang-si (KR)

(72) Inventors: Min Serk Kwon, Pohang-si (KR); Tae Young No, Pohang-si (KR); Chang Soo Park, Pohang-si (KR); Heon-Jo Choi, Pohang-si (KR)

(73) Assignee: POSCO, Pohang-si (KR)

( * ) Notice: Subject to any disclaimer, the term of this patent is extended or adjusted under 35 U.S.C. 154(b) by 110 days.

(21) Appl. No.: 16/345,521

(22) PCT Filed: Oct. 25, 2017

(86) PCT No.: PCT/KR2017/011850
§ 371 (c)(1),
(2) Date: Apr. 26, 2019

(87) PCT Pub. No.: WO2018/080168
PCT Pub. Date: May 3, 2018

(65) Prior Publication Data
US 2019/0276911 A1 Sep. 12, 2019

(30) Foreign Application Priority Data

Oct. 26, 2016 (KR) .................. 10-2016-0139936

(51) Int. Cl.
*C21D 9/46* (2006.01)
*C21D 8/02* (2006.01)
(Continued)

(52) U.S. Cl.
CPC .............. *C21D 9/46* (2013.01); *C04B 35/465* (2013.01); *C21D 1/68* (2013.01); *C21D 3/04* (2013.01);
(Continued)

(58) Field of Classification Search
CPC ..... C04B 2235/3206; C04B 2235/3232; C04B 2235/3236; C04B 2235/448; C04B 35/465
See application file for complete search history.

(56) References Cited

U.S. PATENT DOCUMENTS

| 3,985,583 A * | 10/1976 | Shimanaka ............. C23C 22/33 148/245 |
| 2015/0318092 A1* | 11/2015 | Shingaki ................. C22C 38/02 148/111 |

FOREIGN PATENT DOCUMENTS

| CN | 104726662 A | 6/2015 |
| CN | 104884646 A | 9/2015 |

(Continued)

OTHER PUBLICATIONS

Written Opinion and International Search Report dated Jan. 30, 2018 issued in International Patent Application No. PCT/KR2017/011850 (with English translation).

(Continued)

*Primary Examiner* — Jenny R Wu
(74) *Attorney, Agent, or Firm* — Morgan, Lewis & Bockius LLP

(57) ABSTRACT

Provided is an annealing separating agent composition for a grain-oriented electrical steel sheet, a grain-oriented electrical steel sheet and a method for manufacturing a grain-oriented electrical steel sheet. The annealing separating agent composition for a grain-oriented electrical steel sheet according to an embodiment of the present invention contains 30 to 70% by weight of a calcium compound, and the
(Continued)

remainder of magnesium oxide or magnesium hydroxide on a solid basis.

13 Claims, 7 Drawing Sheets

(51) Int. Cl.
    *C21D 8/12*     (2006.01)
    *C21D 3/04*     (2006.01)
    *C21D 6/00*     (2006.01)
    *C22C 38/60*     (2006.01)
    *C22C 38/04*     (2006.01)
    *C22C 38/02*     (2006.01)
    *C22C 38/06*     (2006.01)
    *C22C 38/00*     (2006.01)
    *C04B 35/465*     (2006.01)
    *C21D 1/68*     (2006.01)

(52) U.S. Cl.
    CPC ........... *C21D 6/008* (2013.01); *C21D 8/0205* (2013.01); *C21D 8/12* (2013.01); *C21D 8/1222* (2013.01); *C21D 8/1233* (2013.01); *C21D 8/1255* (2013.01); *C21D 8/1272* (2013.01); *C21D 8/1283* (2013.01); *C22C 38/001* (2013.01); *C22C 38/008* (2013.01); *C22C 38/02* (2013.01); *C22C 38/04* (2013.01); *C22C 38/06* (2013.01); *C22C 38/60* (2013.01); *C04B 2235/3206* (2013.01); *C04B 2235/3232* (2013.01); *C04B 2235/3236* (2013.01); *C04B 2235/448* (2013.01); *C21D 2201/05* (2013.01); *C21D 2211/001* (2013.01)

(56) References Cited

FOREIGN PATENT DOCUMENTS

| | | | | |
|---|---|---|---|---|
| EP | 2765219 | A1 | 8/2014 | |
| EP | 2940158 | A1 | 11/2015 | |
| EP | 3225701 | A1 | 10/2017 | |
| JP | 05079442 | A * | 6/1975 | |
| JP | 6479381 | A * | 3/1989 | ........... C21D 8/1283 |
| JP | S6479381 | A * | 3/1989 | ............... C21D 1/70 |
| JP | S6479381 | A | 3/1989 | |
| JP | H07-228977 | A | 8/1995 | |
| JP | 2683036 | B2 | 8/1997 | |
| JP | H11-222654 | A | 8/1999 | |
| JP | 11343579 | A * | 12/1999 | |
| JP | H11-335861 | A | 12/1999 | |
| JP | H11-343579 | A | 12/1999 | |
| JP | 2000-104143 | A | 4/2000 | |
| JP | 2000104143 | A * | 4/2000 | |
| JP | 2000-260631 | A | 9/2000 | |
| JP | 2002-241955 | A | 8/2002 | |
| JP | 2007-051314 | A | 3/2007 | |
| JP | 2008-127635 | A | 6/2008 | |
| JP | 2012-052233 | A | 3/2012 | |
| JP | 2014-156633 | A | 8/2014 | |
| JP | 2015-098636 | A | 5/2015 | |
| KR | 10-1995-0032657 | A | 12/1995 | |
| KR | 10-1999-0055434 | A | 7/1999 | |
| KR | 10-2001-0048860 | A | 6/2001 | |
| KR | 10-2002-0074312 | A | 9/2002 | |
| KR | 10-2003-0053746 | A | 7/2003 | |
| KR | 10-0865316 | B1 | 10/2008 | |
| KR | 10-2013-0038713 | A | 4/2013 | |
| KR | 10-2013-0045420 | A | 5/2013 | |
| KR | 10-2014-0084892 | A | 7/2014 | |
| KR | 10-2016-0057754 | A | 5/2016 | |
| KR | 10-2017-0074475 | A | 6/2017 | |
| WO | 2008/062853 | A1 | 5/2008 | |
| WO | 2016/021782 | A1 | 2/2016 | |

OTHER PUBLICATIONS

Extended European Search Report dated Jul. 5, 2019 issued in European Patent Application No. 17865788.8.
Chinese Search Report dated May 26, 2020 issued in Chinese Patent Application No. 201780066821.7.
Office Action issued in corresponding European Patent Application No. 17865788.8, dated Jan. 21, 2021.

* cited by examiner

ANNEALING SEPARATING AGENT COMPOSITION FOR GRAIN-ORIENTED ELECTRICAL STEEL SHEET, GRAIN-ORIENTED ELECTRICAL STEEL SHEET, AND METHOD FOR MANUFACTURING GRAIN ORIENTED ELECTRICAL STEEL SHEET

CROSS-REFERENCE OF RELATED APPLICATIONS

This application is the U.S. National Phase under 35 U.S.C. § 371 of International Patent Application No. PCT/KR2017/011850, filed on Oct. 25, 2017, which in turn claims the benefit of Korean Application No. 10-2016-0139936, filed on Oct. 26, 2016, the entire disclosures of which applications are incorporated by reference herein.

TECHNICAL FIELD OF THE INVENTION

The invention relates to an annealing separating agent composition for a grain-oriented electrical steel sheet, a grain-oriented electrical steel sheet, and a method for manufacturing a grain-oriented electrical steel sheet.

BACKGROUND OF THE INVENTION

In general, a grain-oriented electrical steel sheet is a steel sheet containing Si component of about 3.1%. Since it has an aggregate structure in which the grain orientations are aligned in the {100}<001> orientation, it has extremely excellent magnetic properties in the rolling direction. Generally known grain-oriented electrical steel sheets are formed by forming an insulating coating on a Forsterite ($Mg_2SiO_4$)-based coating and applying a tensile stress to the steel sheet using the difference in thermal expansion coefficient of the insulating coating, thereby improving iron loss and reducing noise due to magnetostriction. However, there is a limit to satisfy the characteristic level in the advanced grain-oriented electrical steel sheet which is recently required.

In the conventional grain-oriented electrical steel sheet manufacturing process, there has been proposed a method of improving the surface properties of $TiO_2$ powder by MgO in the step of applying a fusion preventive agent containing MgO as a main component in order to improve the properties of the Forsterite coating. Further, a method of removing the Forsterite coating by applying a mixture of alumina powder or colloidal silica and $MgCl_2$ as a fusion preventive agent is known as a method for improving the iron loss of a grain-oriented electrical steel sheet. However, such a method has a problem that, due to the removal of the Forsterite coating, the iron loss of the electrical steel sheet is rather disadvantageous. Further, there is a problem that it is difficult to form an insulating coating in a subsequent process.

DETAILS OF THE INVENTION

Problems to be Solved

Provided is an annealing separating agent composition for a grain-oriented electrical steel sheet, a grain-oriented electrical steel sheet, and a method for manufacturing a grain-oriented electrical steel sheet.

Means to Solve the Problems

An annealing separating agent composition for a grain-oriented electrical steel sheet according one embodiment of the present invention may comprise, based on the solids content, 30 to 70% by weight of a calcium compound, and magnesium oxide or magnesium hydroxide in a balance.

The composition may further include 1 to 10% by weight of the ceramic powder. The ceramic powder may be at least one selected from the group consisting of $Al_2O_3$, $SiO_2$, $TiO_2$, and $ZrO_2$.

The composition may further include $Sb_2(SO_4)_3$, $SrSO_4$, $BaSO_4$, or a combination thereof in an amount of 1 to 10% by weight.

The calcium compound may be at least one selected from calcium oxide (CaO), calcium hydroxide ($Ca(OH)_2$), calcium cobalt oxide ($Ca_3Co_4O_9$), calcium silicate ($CaSiO_3$), calcium titanate ($CaTiO_3$), calcium zirconate ($CaZrO_3$), hydroxyapatite ($Ca_5(OH)(PO_4)_3$), calcium carbonate ($CaCO_3$), calcium hydride ($CaH_2$), calcium carbide ($CaC_2$), calcium phosphate ($Ca_3(PO_4)_2$), calcium sulfate ($CaSO_4$), calcium oxylate ($CaC_2O_4$), calcium peroxide ($CaO_2$), and calcium chromate ($CaCrO_4$) A grain-oriented electrical steel sheet according to one embodiment of the present invention may have a Monticellite coating formed on one side or both sides of a grain-oriented electrical steel sheet substrate.

The Monticellite coating may include 0.5 to 90% by weight of Ca.

The Monticellite coating may further include Mg in an amount of 3 to 80% by weight, Si in an amount of 3 to 80% by weight, O in an amount of 3 to 80% by weight, and Fe in a balance.

The Monticellite coating may have a thickness of 0.1 to 10 μm.

A ceramic layer may be further formed on the Monticellite coating.

The ceramic layer may include a ceramic powder.

The ceramic powder may be at least one selected from $Al_2O_3$, $SiO_2$, $TiO_2$, $ZrO_2$, $Al_2O_3$, $TiO_2$, $Y_2O_3$, $9Al_2O_3 \cdot 2B_2O_3$, BN, CrN, $BaTiO_3$, SiC, and TiC.

The ceramic layer may further include a metal phosphate.

The metal phosphate may include at least one selected from Mg, Ca, Ba, Sr, Zn, Al, and Mn.

The grain-oriented electrical steel sheet substrate may include silicon (Si): 2.8 to 6.8 wt. %, aluminum (Al): 0.020 to 0.040 wt. %, manganese (Mn): 0.01 to 0.20 wt. %, antimony (Sb), tin (Sn), or a combination thereof in an amount of 0.01 to 0.15 wt. %, and Fe and other unavoidable impurities in a balance.

A manufacturing method of a grain-oriented electrical steel sheet according to one embodiment of the present invention may include preparing a steel slab; heating the steel slab; hot-rolling the heated steel slab to produce a hot-rolled steel sheet; cold-rolling the hot-rolled sheet to produce a cold-rolled sheet; decarburizing annealing and nitriding annealing the cold-rolled sheet; applying an annealing separating agent on the surface of the decarburizing annealed and nitriding annealed steel sheet; and high-temperature annealing the steel sheet applied with the annealing separating agent.

The annealing separating agent may include, based on a solid content, 30 to 70% by weight of a calcium compound, and magnesium oxide or magnesium hydroxide in a balance.

The method may further include a step of forming a ceramic layer on the Monticellite coating after the high-temperature annealing.

The step of forming the ceramic layer may be a step of forming a ceramic layer by spraying a ceramic powder onto the Monticellite coating.

The step of forming the ceramic layer may be a step of forming a ceramic layer by applying a composition for forming a ceramic layer including a ceramic powder and a metal phosphate on the Monticellite coating.

The step of decarburization annealing and nitriding annealing the cold-rolled sheet may be a step of decarburization annealing and nitriding annealing the cold-rolled sheet simultaneously, or nitriding annealing the cold-rolled sheet after decarburization annealing.

Effects of the Invention

According to one embodiment of the present invention, it is possible to provide a grain-oriented electrical steel sheet having excellent iron loss and magnetic flux density and excellent adhesion and insulation of a coating, and a method for manufacturing the same.

BRIEF DESCRIPTIONS OF DRAWINGS

FIG. 1 schematically shows a Monticellite atomic unit structure.

DETAILED DESCRIPTIONS OF THE INVENTION

The terms first, second, third, and the like are used to describe various portions, components, regions, layers and/or sections, but are not limited thereto. These terms are only used to distinguish one portion, component, region, layer or section from another portion, component, region, layer or section. Thus, a first portion, component, region, layer or section described below may be referred to as a second portion, component, region, layer or section without departing from the scope of the present invention.

The terminology used herein is for the purpose of describing particular embodiments only and is not intended to limit the invention The singular forms as used herein include plural forms as long as the phrases do not specifically state the opposite meaning thereof. The "comprises" means that a particular characteristic, region, integer, step, motion, element and/or component is specified and that does not exclude the presence or addition of other characteristics, regions, integers, steps, motions, elements, and/or components.

When referring to a part as being "on" or "above" another part, it may be positioned directly on or above another part, or another part may be interposed therebetween. In contrast, when referring to a part being "directly above" another part, no other part is interposed therebetween.

Further, in the present invention, 1 ppm means 0.0001%.

Unless defined otherwise, all terms including technical and scientific terms used herein have the same meaning as commonly understood by one of ordinary skill in the art to which the present invention belongs. Terms defined in the commonly used dictionary are further interpreted as having a meaning consistent with the relevant technical literature and the present disclosure, and are not to be construed as ideal or very formal meanings unless defined otherwise.

Hereinafter, embodiments of the present invention will be described in detail so that a person of ordinary skill in the art could easily carry out the present invention. The present invention may, however, be embodied in various forms and should not be construed as limited to the embodiments set forth herein.

The annealing separating agent composition for a grain-oriented electrical steel sheet according to an embodiment of the present invention contains 30 to 70% by weight of a calcium compound, and magnesium oxide or magnesium hydroxide in a balance on a solid basis. Here, the solid basis means that the solid content excluding the components such as solvent is set to 100% by weight.

The annealing separating agent composition according to an embodiment of the present invention is applied to the grain-oriented electrical steel sheet substrate 10 to form the Monticellite coating 20.

Figure 1:
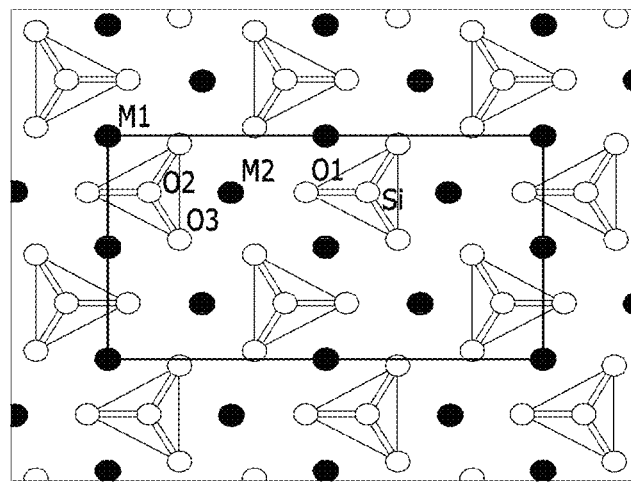

Monticellite is an olivine group consisting of the atomic unit structure as shown in FIG. 1. The magnesium ion is present at the M1 site and the calcium ion is present at the M2 site. In FIG. 1, oxygen (O) is represented by a red circle, silicon (Si) by a pink circle, and Ca and Mg by a blue circle.

The Monticellite coating 20 has a chemical structure change due to the substitution of Ca ion at the M2 site compared to the conventional Forsterite coating. The melting point is lowered, so that the glass coating formation temperature is lowered in the high-temperature annealing process. In addition, the Monticellite coating formed in the low-temperature region has an effect of inhibiting the decomposition of the AlN-based inhibitor, which has a decisive influence on the formation of the secondary recrystallization, and thus it can secure excellent magnetic quality. Also, Monticellite has Mohs hardness lower than that of Forsterite, and thus has an advantage of excellent coating adhesion.

The calcium compound serves to supply Ca of Monticellite. Unlike the conventional annealing separating agent composition, in an embodiment of the present invention, the Monticellite coating 20 is formed on the steel sheet substrate 10 by adding a calcium compound.

The calcium compound may not be limited as long as it is a compound capable of supplying Ca. Specifically, it can be at least one selected from calcium oxide (CaO), calcium hydroxide ($Ca(OH)_2$), calcium cobalt oxide ($Ca_3Co_4O_9$), calcium silicate ($CaSiO_3$), calcium titanate ($CaTiO_3$), calcium zirconate ($CaZrO_3$), hydroxyapatite ($Ca_5(OH)(PO_4)_3$), calcium carbonate ($CaCO_3$), calcium hydride ($CaH_2$), calcium carbide ($CaC_2$), calcium phosphate ($Ca_3(PO_4)_2$), calcium sulfate ($CaSO_4$), calcium oxylate ($CaC_2O_4$), calcium peroxide ($CaO_2$), and calcium chromate ($CaCrO_4$).

The calcium compound may be contained in the annealing separating agent composition in an amount of 30 to 70% by weight. When the calcium compound is contained too small, the Ca content in the Monticellite coating 20 may be decreased and the iron loss may be deteriorated. If the calcium compound is contained too much, the Ca content in the Monticellite coating 20 may be increased and the corrosion resistance may be deteriorated. Therefore, calcium compounds may be included in the above-mentioned range.

More specifically, the calcium compound may include 40 to 60% by weight. More specifically, the calcium compound may include 45 to 55% by weight.

The magnesium oxide or magnesium hydroxide serves to supply Mg of Monticellite. The magnesium oxide or magnesium hydroxide may be magnesium oxide (MgO). Since the magnesium oxide (MgO) is generally known, a detailed description thereof will be omitted.

The annealing separating agent composition for a grain-oriented electrical steel sheet may further comprise 1 to 10% by weight of a ceramic powder. The ceramic powder may be at least one selected from $Al_2O_3$, $SiO_2$, $TiO_2$, and $ZrO_2$. When the ceramic powder further contains an appropriate amount, the insulating property of the Monticellite coating 20 can be further improved.

The annealing separating agent composition for a grain-oriented electrical steel sheet may further include 1 to 10% by weight of $Sb_2(SO_4)_3$, $SrSO_4$, $BaSO_4$ or a combination thereof. By further including proper amount of $Sb_2(SO_4)_3$, $SrSO_4$, $BaSO_4$, or a combination thereof, a grain-oriented electrical steel sheet having an excellent surface gloss and a very high roughness can be produced.

The annealing separating agent composition may further include a solvent for even dispersion and easy application of the solids. Water, alcohol, and the like can be used as a solvent. 300 to 1000 parts by weight can be included relative to 100 parts by weight of the solid content. As such, the annealing separating agent composition may be in the form of a slurry.

Figure 2:
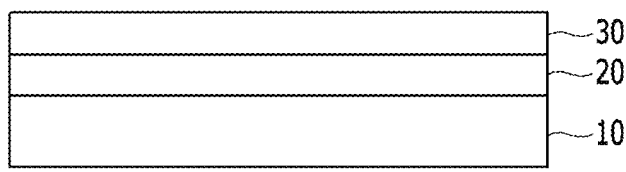
FIG. 2 is a schematic side cross-sectional view of a grain-oriented electrical steel sheet according to an embodiment of the present invention.

The grain-oriented electrical steel sheet 100 according to an embodiment of the present invention has a Monticellite coating 20 formed on one side or both sides of the grain-oriented electrical steel sheet substrate 10. FIG. 2 is a schematic side cross-sectional view of a grain-oriented electrical steel sheet according to an embodiment of the present invention. FIG. 2 shows a case where the Monticellite coating 20 is formed on the upper surface of the grain-oriented electrical steel sheet substrate 10.

The Monticellite coating 20 has a chemical structure change due to the substitution of Ca ion at the M2 site compared to the conventional Forsterite coating. The melting point is lowered, so that the glass coating formation temperature is lowered in the high temperature annealing process to secure the good quality of surface property. In addition, the Monticellite coating formed in the low temperature region has an effect of inhibiting the decomposition of the AlN-based inhibitor, which has a decisive influence on the formation of the secondary recrystallization, and thus it can secure excellent magnetic quality. Also, Monticellite has Mohs hardness lower than that of Forsterite, and thus has an advantage of excellent coating adhesion.

The Monticellite coating may contain 0.5 to 90% by weight of Ca. If the Ca content in the Monticellite coating 20 is too small, the iron loss of the grain-oriented electrical steel sheet may be deteriorated. If the Ca content in the Monticellite coating 20 is too high, the corrosion resistance may be deteriorated. Therefore, Ca may be included in the above-mentioned range. More specifically, Ca may be contained in an amount of 4 to 65% by weight.

The Monticellite coating may contain 3 to 80% by weight of Mg. If the Mg content is too low, the formation amount of the Monticellite coating is insufficient, causing surface defects. If the Mg content is too high, Forsterite may be formed and the iron loss property may be deteriorated. Therefore, Mg may be included in the above-mentioned range. Specifically, Mg may be contained in an amount of 5 to 50% by weight. More specifically, Mg may be contained in an amount of 7 to 15% by weight.

The Monticellite coating may contain 3 to 80% by weight of Si. If the Si content is too small, the formation amount of the Monticellite coating may be insufficient and the adhesion property mat be deteriorated. If the Si content is too high, surface defects of the whitening phenomenon may occur. Therefore, Si may be included in the above-mentioned range. Specifically, it may contain 5 to 50% by weight of Si. More specifically, it may contain 7 to 15% by weight of Si.

The Monticellite coating may contain 3 to 80% by weight of oxygen (O). More specifically, it may contain 5 to 50% by weight of O. More specifically, it may contain 7 to 15% by weight of O.

The Monticellite coating may contain Fe as the remainder. Carbon (C) may be included as an impurity.

The Monticellite is formed by reacting calcium (Ca) and magnesium (Mg), which are the main components of the composition, with silicon (Si) contained in the grain-oriented electrical steel sheet during the application of the annealing separating agent composition. The Monticellite coating 20 has an excellent coating tensioning imparting effect.

The Monticellite coating 20 may have a thickness of 0.1 to 10 μm. If the thickness of the Monticellite coating 20 is too thin, the coating tension imparting ability may be lowered to cause a problem for deteriorating the iron loss. If the thickness of the Monticellite coating 20 is too thick, the adhesion of the Monticellite coating 20 may be weakened and may cause peeling. Therefore, the thickness of the Monticellite coating 20 can be adjusted to the above-mentioned range. More specifically, the thickness of the Monticellite coating 20 may be 0.8 to 6 μm.

The grain-oriented electrical steel sheet 100 according to an embodiment of the present invention may further include a ceramic layer 30 on the Monticellite coating 20. FIG. 2 shows an example in which a ceramic layer 30 is further formed on the Monticellite coating 20.

The thickness of the ceramic layer 30 may be 0.5 to 5 μm. If the thickness of the ceramic layer 30 is too thin, the insulating effect of the ceramic layer 30 may be small. If the thickness of the ceramic layer 30 is too thick, the adhesion of the ceramic layer 30 becomes low, and peeling may occur. Therefore, the thickness of the ceramic layer 30 can be adjusted to the above-mentioned range. More specifically, the thickness of the ceramic layer 30 may be 0.8 to 3.2 μm.

The ceramic layer 30 may comprise a ceramic powder. The ceramic powder may be at least one selected from $Al_2O_3$, $SiO_2$, $TiO_2$, $ZrO_2$, $Al_2O_3.TiO_2$, $Y_2O_3$, $9Al_2O_3.2B_2O_3$, BN, CrN, $BaTiO_3$, SiC, and TiC. The particle diameter of the ceramic powder may be 2 to 900 nm. If the particle diameter of the ceramic powder is too small, the formation of the ceramic layer may become difficult. If the particle diameter of the ceramic powder is too large, the surface roughness may become high and surface defects may occur. Therefore, the particle diameter of the ceramic powder can be adjusted to the above-mentioned range.

The ceramic powder may be in the form of any one or more selected from the group including spherical, plate-like, and needle-shaped.

The ceramic layer 30 may further comprise a metal phosphate. The metal phosphate may include at least one selected from Mg, Ca, Ba, Sr, Zn, Al and Mn. When the ceramic layer further includes the metal phosphate, the insulating property of the ceramic layer 30 is further improved.

The metal phosphate may be composed of a compound by chemical reaction of metal hydroxide and phosphoric acid ($H_3PO_4$).

The metal phosphate may be a compound formed by chemical reaction of metal hydroxide and phosphoric acid ($H_3PO_4$). The metal hydroxide may be at least one selected from the group including $Ca(OH)_2$, $Al(OH)_3$, $Mg(OH)_2$, $B(OH)_3$, $Co(OH)_2$, and $Cr(OH)_3$.

Specifically, the metal atom of the metal hydroxide may be composed of forming a single bond, a double bond, or a triple bond by a substitution reaction with phosphorous of phosphoric acid, and a compound wherein the amount of unreacted free phosphoric acid ($H_3PO_4$) is 25 wt. % or lower.

The metal phosphate may be a compound formed by a chemical reaction between metal hydroxide and phosphoric acid ($H_3PO_4$), and the weight ratio of metal hydroxide to phosphoric acid may be 1:100 to 40:100.

If the amount of the metal hydroxide is too much, the chemical reaction may not be completed and the problem of generating precipitates may occur. If the metal hydroxide is contained too little, the problem of corrosion resistance may occur. Thus, the amount may be limited to the above-mentioned range.

The reason for limiting the components of the grain-oriented electrical steel sheet substrate 10 will be described in the below.

Si: 2.8 to 6.8% by weight

Silicon (Si) increases the resistivity of the steel to reduce iron loss. When the content of Si is too small, the resistivity of the steel becomes small and the iron loss characteristic deteriorates. Further, in the high-temperature annealing, the phase transformation zone exists, thereby causing the problem of destabilizing the second recrystallization. If the content of Si is too large, the brittleness may be increased and cold-rolling may become difficult. Therefore, the content of Si can be controlled within the above-mentioned range. More specifically, Si may be contained in an amount of 3.8 to 5.8% by weight.

Al: 0.020 to 0.040% by weight

Aluminum (Al) is a component that acts as an inhibitor by finally being nitride of AlN, (Al,Si)N, (Al,Si,Mn)N type. When the content of Al is too small, it is difficult to expect a sufficient effect as an inhibitor. When the content of Al is too large, the Al-based nitride precipitates and grows too large. Thus, the effect as an inhibitor may become insufficient. Therefore, the content of Al can be controlled within the above-mentioned range.

Mn: 0.01 to 0.20% by weight

Manganese (Mn) has the effect of reducing the iron loss by increasing the resistivity as Si and reacting with the nitrogen introduced by the nitriding treatment together with Si to form precipitates of (Al,Si,Mn)N. It is an important element for suppressing the growth of the primary recrystallization grains and causing the secondary recrystallization. However, when the content of Mn is too large, it accelerates the Austenite phase transformation during the hot-rolling so that the size of the primary recrystallization grains is reduced to make the secondary recrystallization unstable. In addition, when the content of Mn is too small, the effect of increasing the Austenite fraction during the hot-rolling reheating as the Austenite forming element to increase the amount of precipitates and thus to make the primary recrystallization through MnS formation, could be insufficient. Therefore, the content of Mn can be controlled within the above-mentioned range.

Sb, Sn or a combination thereof: 0.01 to 0.15% by weight

Sb or Sn is a grain boundary segregation element which interferes with the grain boundary movement. It promotes the generation of Goss grain in the {110}<001> orientation as a grain growth inhibitor, so that the secondary recrystallization is well developed. Thus, it is important for controlling grain size. If the content of Sb or Sn added alone or in combination is too small, the effect may be deteriorated. If the content of Sb or Sn added alone or in combination is too large, the grain boundary segregation occurs severely and the brittleness of the steel sheet becomes large. Thus, a plate breakage may occur during the rolling.

More specifically, it may contain 0.01 to 0.05% by weight of Sb and 0.01 to 0.12% by weight of Sn.

C: 0.01% by weight or less

C is a component which does not greatly contribute to the improvement of the magnetic properties of the grain-oriented electrical steel sheet in the embodiment of the present invention, and thus it is preferable to remove C as much as possible. However, if the C content is above a certain level, the Austenite transformation of the steel is promoted in the rolling. Thus, the hot-rolled structure is refined during the hot-rolling which facilitates the formation of uniform microstructure.

Therefore, the preferred C content in the slab is 0.03 weight % or more. However, when the C content is excessive, coarse carbide is produced which is not easily removed during decarburization. Thus, it is preferable to contain 0.08 wt. % or less of C. The carbon is decarburized through the decarburization annealing in the process of manufacturing the grain-oriented electrical steel sheet. In the final rain-oriented electrical steel sheet may contain 0.01 wt. % or less of C.

N: 0.001 to 0.005% by weight

N is an element that reacts with Al or the like to refine the grains. When these elements are appropriately distributed, it is possible to appropriately refine the structure after the cold-rolling as described above, thereby ensuring proper primary recrystallization grain size. However, if the content is excessive, the primary recrystallized grains are excessively refined. As a result, due to the fine grains, the driving force causing grain growth during the secondary recrystallization increases, so that the even grains in undesired orientation can grow. Also, if the N content is excessive, it takes a long time to remove N in the final annealing process, which is not preferable. Therefore, the upper limit of the nitrogen content should be 0.005 wt. %. Further, the nitrogen content should be 0.001 wt. % or more when reheating the slab. Thus, the lower limit of the nitrogen content is preferably 0.001 wt. %. Nitrogen is partially penetrated through the nitriding annealing process in the production of the grain-oriented electrical steel sheet, and N is included in the final grain-oriented electrical steel sheet in an amount of 0.005 to 0.05% by weight.

Figure 3:
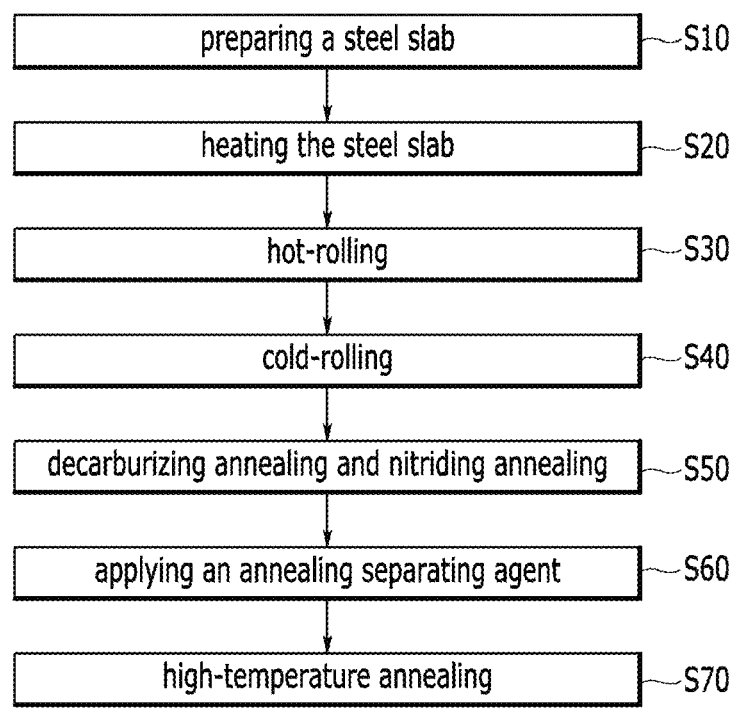
FIG. 3 is a flowchart of a method of manufacturing a grain-oriented electrical steel sheet according to an embodiment of the present invention.

FIG. 3 schematically shows a flow chart of a method of manufacturing a grain-oriented electrical steel sheet according to an embodiment of the present invention.

The flow chart of the method of manufacturing the grain-oriented electrical steel sheet of FIG. 3 is merely for illustrating the present invention, and the present invention is not limited thereto. Therefore, the manufacturing method of the grain-oriented electrical steel sheet can be variously modified.

As shown in FIG. 3, a method of manufacturing a grain-oriented electrical steel sheet includes: preparing a steel slab (S10); heating the steel slab (S20); hot-rolling the heated steel slab to produce a hot-rolled steel sheet (S30);

cold-rolling the hot-rolled sheet to produce a cold-rolled sheet (S40); decarburization annealing and nitriding annealing the cold-rolled steel sheet (S50); applying an annealing separating agent on the surface of the steel sheet subjected to decarburization annealing and nitriding annealing (S60); and annealing the steel sheet coated with the annealing separating agent at a high temperature (S70). In addition, the manufacturing method of the grain-oriented electrical steel sheet may further include other steps.

First, in the step S10, a steel slab is prepared. Since the components of the steel slab are described in detail with respect to the components of the grain-oriented electrical steel sheet described above, repeated description is omitted.

Next, in the step S20, the steel slab is heated. At this time, the slab heating can be performed by the low-temperature slab method at 1,200° C. or less.

Next, in the step S30, the heated steel slab is hot-rolled to produce a hot-rolled steel sheet. After the step S30, the produced hot-rolled sheet can be subject to hot-rolled annealing.

Next, in the step S40, the hot-rolled sheet is cold-rolled to produce a cold-rolled sheet. In the step S40, the cold-rolling may be performed once, or the cold-rolling may be performed twice or more including intermediate annealing.

Next, in the step S50, the cold-rolled sheet can be subject to decarburization annealing and nitriding annealing. At this time, the step of decarburization annealing and nitriding annealing the cold-rolled sheet can be performed by decarburization annealing and nitriding annealing at the same time, or nitriding annealing after decarburization annealing.

Next, in the step S60, the annealing separating agent is applied on the surface of the steel sheet subject to decarburization annealing and nitriding annealing. Since the annealing separating agent has been described above in detail, repeated description is omitted.

Next, in the step S70, the steel sheet coated with the annealing separating agent is annealed at a high temperature. During the high-temperature annealing, Ca and Mg in the annealing separating agent react with Si in the grain-oriented electrical steel sheet substrate 10 to form the Monticellite coating 20.

The primary cracking temperature and the secondary cracking temperature are 1200° C. and 700° C., respectively. In the high-temperature annealing, it is controlled to raise 15° C./hr in the temperature elevating zone. In addition, the gas atmosphere may be a mixed gas atmosphere of 25% nitrogen and 75% hydrogen until 1200° C., and after reaching 1200° C., it may be maintained in a 100% hydrogen atmosphere for 15 hours and then furnace-cooled.

After the step S70, the step of forming the ceramic layer 30 may be further comprised. Since the ceramic layer 30 has been described in the above in detail, repeated description is omitted. As a method for forming the ceramic layer 30, a ceramic layer may be formed by spraying a ceramic powder onto the Monticellite coating. Specifically, plasma spray coating, high velocity oxy fuel coating, aerosol deposition, and cold spray coating can be applied. More specifically, a plasma spray coating method that a ceramic layer is formed by supplying a ceramic powder to a heat source in which a gas containing Ar, $H_2$, $N_2$, or He is plasma-generated at an output of 20 to 300 kW, may be used. As a plasma spray coating method, a gas containing Ar, $H_2$, $N_2$, or He may be supplied in a suspension form of a mixture of a ceramic powder and a solvent to a heat source of plasma with an output of 20 to 300 kW to form a ceramic layer 30. At this time, the solvent may be water or alcohol.

As a method for forming the ceramic layer 30, a method of forming a ceramic layer by applying a composition for forming a ceramic layer containing ceramic powder and metal phosphate may be used.

After formation of the ceramic layer 30, magnetic domain refining can be performed as required.

Hereinafter, the present invention will be described in more detail with reference to examples. However, these embodiments are only for illustrating the present invention, and the present invention is not limited thereto.

Example 1: Properties of Ceramic Powders

Example 1

The slab consisting of 3.4 wt. % of silicon (Si), 0.03 wt. % of aluminum (Al), 0.05 wt. % of manganese (Mn), 0.04 wt. % of antimony (Sb), and 0.11 wt. % of tin (Sn), 0.06 wt. % of carbon (C), and 40 weight ppm of nitrogen (N), and the remainder of Fe and other unavoidable impurities, was prepared.

The slab was heated at 1150° C. for 220 minutes and hot-rolled to a thickness of 2.3 mm to prepare a hot-rolled sheet.

The hot-rolled sheet was heated to 1120° C., held at 920° C. for 95 seconds, quenched in water and pickled, and then cold-rolled to a thickness of 0.23 mm to prepare a cold-rolled sheet.

The cold-rolled sheet was put into a furnace maintained at 850° C., and then the dew point and the oxidizing ability were controlled. The decarburization and the primary recrystallization annealing were performed simultaneously in a mixed gas atmosphere of hydrogen, nitrogen, and ammonia to prepare a decarburized and annealed steel sheet.

As an annealing separating agent composition, 50% by weight of calcium titanate ($CaTiO_3$), 40% by weight of magnesium oxide, 5% by weight of titanium oxide, and 5% by weight of $Sb_2(SO_4)_3$ were mixed with distilled water to prepare slurry form. The slurry was applied to a decarburized and annealed steel sheet, and then a final annealing was conducted.

During the final annealing, the primary cracking temperature was 700° C., the secondary cracking temperature was 1200° C., and the temperature was raised 15° C./hr in the temperature elevating zone. In addition, up to 1200° C., a mixed gas atmosphere of 50 vol % of nitrogen and 50 vol % of hydrogen was used. After reaching 1200° C., it was maintained in 100 vol % of hydrogen gas atmosphere for 20 hours and then furnace cooled.

Figure 4:
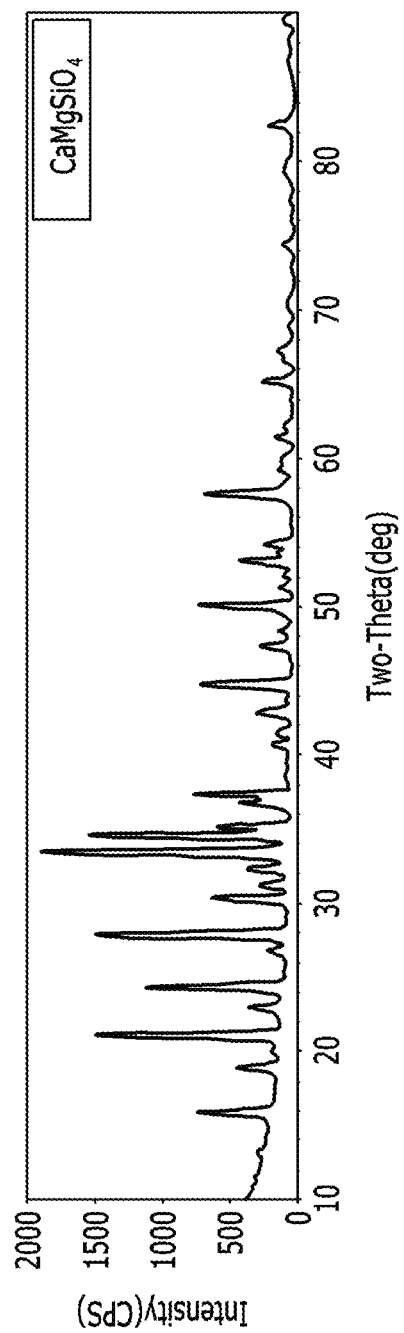
FIG. 4 is an X-ray diffraction (XRD) result of the Monticellite coating prepared in Example 1.
Figure 6:
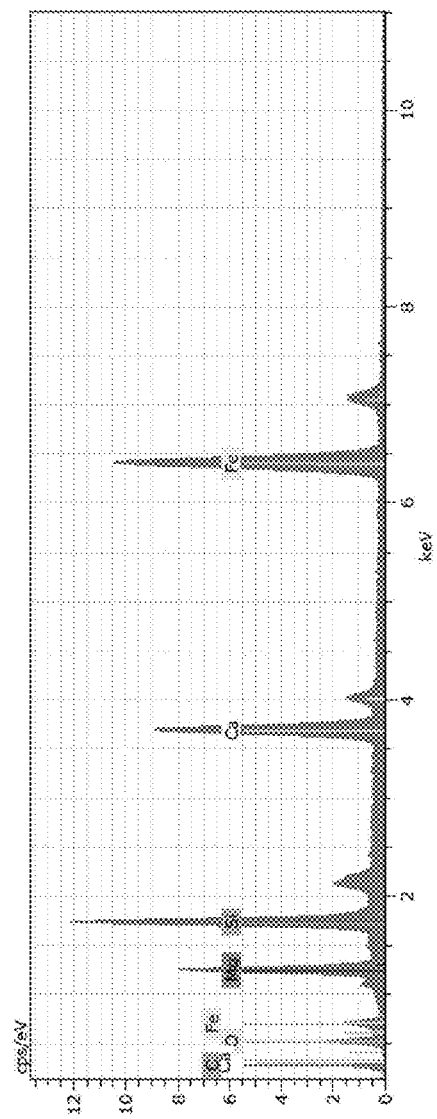
FIG. 6 is a Scanning Electron Microscope based Energy Dispersive Spectroscopy (SEM EDS) analysis result of the Monticellite coating prepared in Example 1.

The Monticellite coating prepared through the final annealing was quantitatively analyzed by X-Ray Diffraction (XRD) and the results are shown in FIG. 4. The SEM EDS analysis results of the Monticellite coating are shown in FIG. 6. As shown in FIG. 6, in the Monticellite coating, it was analyzed that 11.27% by weight of Ca, 8.23% by weight of Mg, 8.30% by weight of Si, and 7.45% by weight of O, were contained.

Thereafter, $TiO_2$ was supplied as a ceramic powder to a heat source in which argon (Ar) gas was converted into plasma at an output of 250 kW to form a ceramic layer having a thickness of 0.9 μm on the surface of the final annealed plate.

Figure 5:
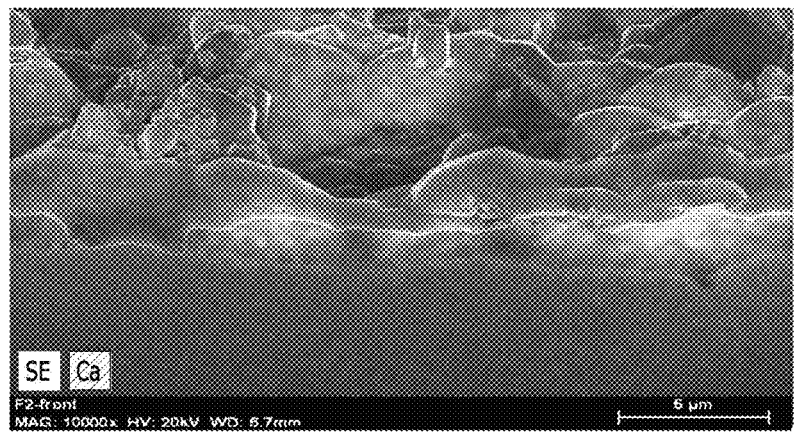
FIG. 5 is a Scanning Electron Microscope (SEM) photograph of the grain-oriented electrical steel sheet produced in Example 1.

FIG. 5 shows a Scanning Electron Microscope (SEM) photograph of the grain-oriented electrical steel sheet produced in Example 1. It can be confirmed that a Monticellite coating containing a calcium component and a ceramic layer were sequentially formed on the grain-oriented electrical steel sheet substrate.

Examples 2-12

The same procedure as in Example 1 was carried out except that the calcium compound and the ceramic powder in the annealing separating agent were replaced with the calcium compound and the ceramic powder set forth in Table 1 below to form a Monticellite coating and a ceramic layer.

power loss when a magnetic field of 50 Hz frequency is magnetized to AC up to 1.7 Tesla. Here, Tesla is a unit of magnetic flux density, which means flux per unit area. B8 shows the magnetic density value of flux flowing through the electric steel sheet when a current of 800 A/m is applied to the coil wound around the electric steel sheet.

In addition, the insulation properties were measured using a Franklin meter according to ASTM A717 International Standard.

Further, the adhesion is represented by the minimum arc diameter without peeling of the coating when the specimen is bent by 180° in contact with the arc of 10 to 100 mm.

TABLE 1

|  | Calcium Compound | Ceramic Powder | Iron Loss (W17/50) | Magnetic Flux Density (B8) | Insulation (mA) | Adhesion (mmφ) |
|---|---|---|---|---|---|---|
| Example 1 | $CaTiO_3$ | $TiO_2$ | 0.650 | 1.916 | 420 | 20 |
| Example 2 | CaO | $SiO_2$ | 0.770 | 1.907 | 520 | 35 |
| Example 3 | $Ca(OH)_2$ | $Al_2O_3$ | 0.634 | 1.922 | 340 | 20 |
| Example 4 | $Ca_3Co_4O_9$ | $ZrO_2$ | 0.752 | 1.904 | 615 | 25 |
| Example 5 | $CaSiO_3$ | $Al_2O_3 \cdot TiO_2$ | 0.682 | 1.932 | 440 | 15 |
| Example 6 | $CaZrO_3$ | $Y_2O_3$ | 0.711 | 1.935 | 615 | 15 |
| Example 7 | $Ca_5(OH)(PO_4)_3$ | $9Al_2O_3 \cdot 2B_2O_3$ | 0.655 | 1.945 | 210 | 20 |
| Example 8 | $CaCO_3$ | BN | 0.764 | 1.909 | 820 | 15 |
| Example 9 | $CaH_2$ | CrN | 0.710 | 1.905 | 790 | 15 |
| Example 10 | $CaC_2$ | $BaTiO_3$ | 0.815 | 1.911 | 120 | 20 |
| Example 11 | $Ca_3(PO_4)_2$ | SiC | 0.789 | 1.915 | 350 | 25 |
| Example 12 | $CaSO_4$ | TiC | 0.750 | 1.910 | 465 | 25 |
| Example 13 | $CaTiO_3$ | — | 0.920 | 1.913 | 750 | 15 |
| Comparative Example 1 | — | — | 0.981 | 1.910 | 982 | 30 |
| Comparative Example 2 | — | $TiO_2$ | 0.765 | 1.915 | 670 | 25 |

It was confirmed that Monticellite coating was formed in all the calcium compounds.

Example 13

The same procedure as in Example 1 was carried out except that no ceramic layer was formed.

Comparative Example 1

The same procedure as in Example 13 was carried out except that the annealing separating agent composition including 90% by weight of magnesium oxide, 5% by weight of titanium oxide, and 5% by weight of $Sb_2(SO_4)_3$ was used.

Comparative Example 2

The same procedure as in Example 1 was carried out except that the annealing separating agent composition including 90 wt. % of magnesium oxide, 5 wt. % of titanium oxide, and 5 wt. % of $Sb_2(SO_4)_3$ was used.

Figure 7:
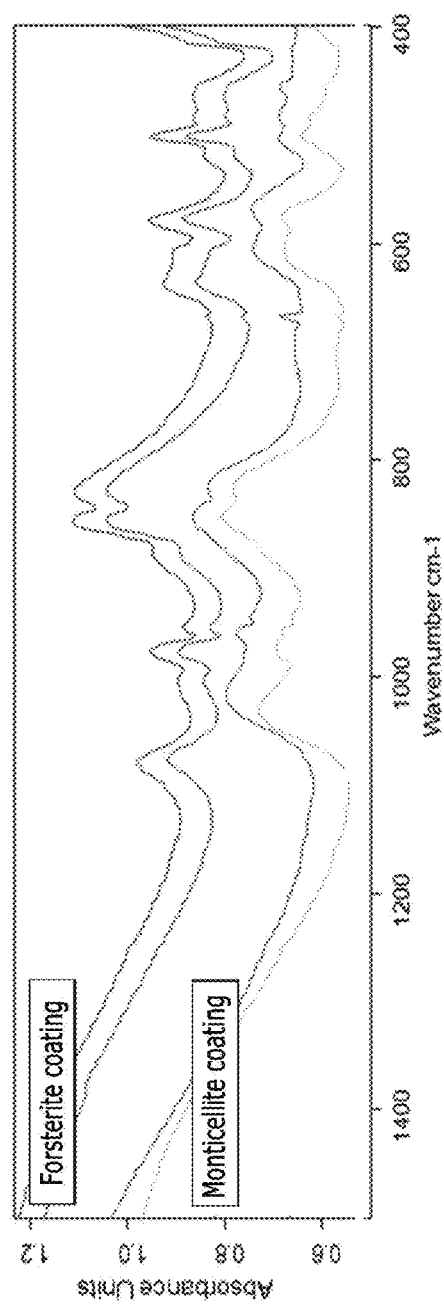
FIG. 7 shows Fourier Transform Infrared Spectroscopy (FT-IR) analysis results of the Monticellite coating and the Fosterite coating prepared in Example 1 and Comparative Example 2.

FIG. 7 shows Fourier Transform Infrared Spectroscopy (FT-IR) analysis results of the Monticellite coating and the Fosterite coating prepared in Example 1 and Comparative Example 2.

The magnetic steel sheets prepared in Examples and Comparative Examples were evaluated for magnetic properties and noise characteristics under the conditions of 1.7 T and 50 Hz, and the results are shown in Table 1 below.

The magnetic properties of the electric steel sheet are usually expressed by W17/50 and B8. W17/50 means the As shown in Table 1, it can be confirmed that the properties of Examples 1 to 13 are superior to those of Comparative Examples 1 and 2.

Experimental Example 2: Evaluation of Magnetic Characteristics, Space Factor and Noise Characteristics of a 1000 kVA Transformer Example 14

The slab consisting of 3.3 wt. % of silicon (Si), 0.03 wt. % of aluminum (Al), 0.03 wt. % of antimony (Sb), 0.06 wt. % of tin (Sn), 0.05 wt. % of carbon (C), and 30 weight ppm of nitrogen (N), and the remainder of Fe and other unavoidable impurities, was prepared.

The slab was heated at 1150° C. for 220 minutes and hot-rolled to a thickness of 2.3 mm to prepare a hot-rolled sheet.

The hot-rolled sheet was heated to 1120° C., held at 920° C. for 95 seconds, quenched in water and pickled, and then cold-rolled to a thickness of 0.23 mm to prepare a cold-rolled sheet.

The cold-rolled sheet was put into a furnace maintained at 850° C., and then the dew point and the oxidizing ability were controlled. The decarburization and the primary recrystallization annealing were performed simultaneously in a mixed gas atmosphere of hydrogen, nitrogen, and ammonia to prepare a decarburized and annealed steel sheet.

As an annealing separating agent composition, 50% by weight of calcium titanate ($CaTiO_3$), 40% by weight of magnesium oxide, 5% by weight of titanium oxide, and 5% by weight of $Sb_2(SO_4)_3$ were mixed with distilled water to prepare slurry form. The slurry was applied to a decarburized and annealed steel sheet, and then a final annealing was conducted.

During the final annealing, the primary cracking temperature was 700° C., the secondary cracking temperature was 1200° C., and the temperature was raised 15° C./hr in the temperature elevating zone. In addition, up to 1200° C., a mixed gas atmosphere of 50 vol % of nitrogen and 50 vol % of hydrogen was used. After reaching 1200° C., it was maintained in 100 vol % of hydrogen gas atmosphere for 20 hours and then furnace cooled.

Thereafter, the composition for forming a ceramic layer mixed with 45% by weight of colloidal silica, 45% by weight of aluminum phosphate, 5% by weight of chromium oxide, and 5% by weight of nickel hydroxide was stirred. The composition was applied 4.5 g/m$^2$ on the final annealed plate. And then, the plate was processed in a drying furnace set at 860° C. for 120 seconds, followed by a laser magnetic domain refining process. A 1000 kVA transformer was manufactured and evaluated at 60 Hz according to the design flux density. The results were shown in Table 2 below.

Comparative Example 3

The same procedure as in Example 14 was carried out except that the annealing separating agent composition including 90% by weight of magnesium oxide, 5% by weight of titanium oxide, and 5% by weight of $Sb_2(SO_4)_3$ was used.

The space factor was measured using a measuring instrument according to the JIS C2550 International Standard. A uniform pressure of 1 MPa was applied to the surface after laminating a plurality of electric steel plate specimens. And then, the ratio of the real weight according to the electric steel plate lamination to the theoretical weight was measured by the precision measurement of the height of the four faces of the specimen.

The noise is evaluated in the same way as the IEC61672-1 International Standard. However, instead of the sound pressure, the vibration data of the electric steel sheet is obtained and evaluated as the noise conversion value [dBA]. The vibration of the electric steel sheet is measured by the non-contact type vibration pattern by using the laser Doppler method when the magnetic field of the frequency 60 Hz is magnetized to AC of 1.7 Tesla.

TABLE 2

| | Coating | Iron Loss (W17/50) | Magnetic Flux Density (B8) | Space Factor (%) | Noise (dBA) |
|---|---|---|---|---|---|
| Example 14 | Monticellite | 0.760 | 1.915 | 97.5 | 51.4 |
| Comparative Example 3 | Fosterite | 0.842 | 1.908 | 96.2 | 55.5 |

As shown in Table 2, it can be seen that the characteristics of Example 14 are far superior to those of Comparative Example 3.

It will be understood by those of ordinary skill in the art that various changes in form and details may be made herein without departing from the spirit and scope of the present invention as defined by the following claims and their equivalents. It will be understood that the invention may be practiced. It is therefore to be understood that the above-described embodiments are illustrative in all aspects and not restrictive.

DESCRIPTION OF SYMBOLS

100: Grain-oriented electrical steel sheet 10: Grain-oriented electrical steel sheet
20: Monticellite coating 30: Ceramic layer What claimed is:

1. A grain-oriented electrical steel sheet, comprising:
   a grain-oriented electrical steel sheet substrate; and
   a Monticellite coating formed on one side or both sides of the grain-oriented electrical steel sheet substrate;
   wherein the Monticellite coating includes Ca in an amount of 0.5 to 90% by weight, Mg in an amount of 3 to 80% by weight, Si in an amount of 3 to 80% weight, O in an amount of 3 to 80% by weight, and Fe in a balance.

2. The grain-oriented electrical steel sheet according to claim 1,
   wherein the Monticellite coating has a thickness of 0.1 to 10 μm.

3. The grain-oriented electrical steel sheet according to claim 1,
   wherein a ceramic layer is further formed on the Monticellite coating.

4. The grain-oriented electrical steel sheet according to claim 3,
   wherein the ceramic layer comprises a ceramic powder.

5. The grain-oriented electrical steel sheet according to claim 4,
   wherein the ceramic powder is at least one selected from the group consisting of $Al_2O_3$, $SiO_2$, $TiO_2$, $ZrO_2$, $Al_2O_3$, $TiO_2$, $Y_2O_3$, $9Al_2O_3.2B_2O_3$, BN, CrN, $BaTiO_3$, SiC, and TiC.

6. The grain-oriented electrical steel sheet according to claim 4,
   wherein the ceramic layer further comprises a metal phosphate.

7. The grain-oriented electrical steel sheet according to claim 6,
   wherein the metal phosphate comprises at least one selected from Mg, Ca, Ba, Sr, Zn, Al, and Mn.

8. The grain-oriented electrical steel sheet according to claim 1,
   wherein the grain-oriented electrical steel sheet substrate comprises silicon (Si): 2.8 to 6.8 wt. %, aluminum (Al): 0.020 to 0.040 wt. %, manganese (Mn): 0.01 to 0.20 wt. %, and antimony (Sb), tin (Sn), or a combination of Sb and Sn in an amount of 0.01 to 0.15 wt. %, Fe and other unavoidable impurities in a balance.

9. A manufacturing method of the grain-oriented electrical steel sheet of claim 1 comprising:
   preparing a steel slab;
   heating the steel slab;
   hot-rolling the heated steel slab to produce a hot-roped steel sheet; cold-rolling the hot-rolled sheet to produce a cold-rolled sheet; decarburizing annealing and nitriding annealing the cod roiled sheet;
   applying an annealing separating agent on the surface of the decarburizing annealed and nitriding annealed steel sheet; and
   high-temperature annealing the steel sheet applied with the annealing separating agent to form the Monticellite coating,
   wherein the annealing separating agent comprises, based on a solid content, 30 to 70% by weight of a calcium compound, and magnesium oxide or magnesium hydroxide in a balance, thereby producing the grain-oriented electrical steel sheet according claim 1.

10. The manufacturing method of a grain-oriented electrical steel sheet according to claim 9,
further comprising a step of forming a ceramic layer on the Monticellite coating after the high-temperature annealing.

11. The manufacturing method of a grain-oriented electrical steel sheet according to claim 10,
wherein the step of forming the ceramic layer is a step of forming a ceramic layer by spraying a ceramic powder onto the Monticellite coating.

12. The manufacturing method of a grain-oriented electrical steel sheet according to claim 10,
wherein the step of forming the ceramic layer is a step of forming a ceramic layer by applying a composition for forming a ceramic layer comprising a ceramic powder and a metal phosphate on the Monticellite coating.

13. The manufacturing method of a grain-oriented electrical steel sheet according to claim 12,
wherein the step of decarburization annealing and nitriding annealing the cold-rolled sheet is a step of decarburization annealing and nitriding annealing the cold-rolled sheet simultaneously, or nitriding annealing the cold-rolled sheet after decarburization annealing.

\* \* \* \* \*